(12) United States Patent
Kurishige et al.

(10) Patent No.: US 7,983,815 B2
(45) Date of Patent: Jul. 19, 2011

(54) ELECTRIC POWER STEERING CONTROL SYSTEM

(75) Inventors: Masahiko Kurishige, Tokyo (JP); Takayuki Kifuku, Tokyo (JP); Seiji Sakanishi, Tokyo (JP); Masaharu Tanaka, Tokyo (JP); Seiji Sawada, Tokyo (JP); Akinobu Sugiyama, Tokyo (JP); Hanako Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 311 days.

(21) Appl. No.: 12/160,438

(22) PCT Filed: Mar. 12, 2007

(86) PCT No.: PCT/JP2007/054840
§ 371 (c)(1),
(2), (4) Date: Jul. 10, 2008

(87) PCT Pub. No.: WO2007/119333
PCT Pub. Date: Oct. 25, 2007

(65) Prior Publication Data
US 2010/0235047 A1    Sep. 16, 2010

(30) Foreign Application Priority Data

Apr. 13, 2006   (JP) ................................. 2006-111239

(51) Int. Cl.
*A01B 69/00*    (2006.01)

(52) U.S. Cl. ...................................................... 701/41
(58) Field of Classification Search .................... 701/41; 180/400, 412, 413, 446; 318/140, 147, 400.23, 318/432, 433, 503
See application file for complete search history.

(56) References Cited

U.S. PATENT DOCUMENTS

| | | | |
|---|---|---|---|
| 6,122,579 A | 9/2000 | Collier-Hallman et al. | |
| 6,161,068 A * | 12/2000 | Kurishige et al. | 701/41 |
| 6,863,150 B1 * | 3/2005 | Tanaka et al. | 180/446 |

FOREIGN PATENT DOCUMENTS

| | | |
|---|---|---|
| EP | 1 006 042 A2 | 7/2000 |
| EP | 1 006 042 A3 | 7/2000 |
| JP | 5 106682 | 4/1993 |
| JP | 5 155352 | 6/1993 |
| JP | 8 91236 | 4/1996 |
| JP | 2000 168600 | 6/2000 |
| JP | 2006 62390 | 3/2006 |

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

In an electric power steering control system, a phase compensator of the steering torque is made of an analog circuit and an anti-phase compensator is made by the software of a microcomputer, thereby to eliminate the changes in the gain and the phase by the phase compensator of the analog circuit near the oscillation frequency, so that the steering torque signal equivalent to that of no phase compensation necessary for the computation at the observer is computed from the phase-compensated steering torque signal.

5 Claims, 8 Drawing Sheets

FIG. 2
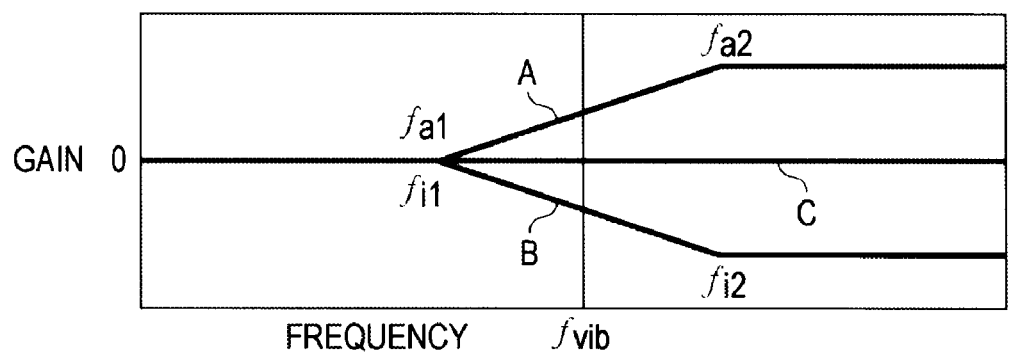
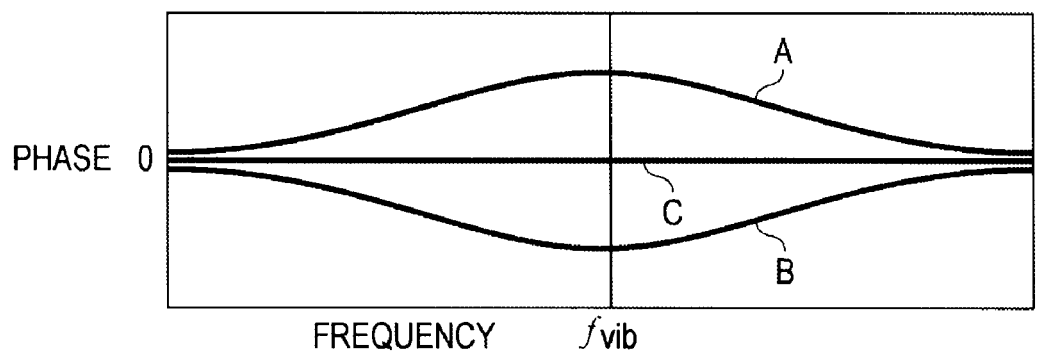

US 7,983,815 B2

ELECTRIC POWER STEERING CONTROL SYSTEM

TECHNICAL FIELD

The invention relates to an electric power steering control system for automobiles.

BACKGROUND ART

In electric power steering systems, an assist torque substantially proportional to a steering torque is determined. The steering torque of a driver of an automobile is reduced by increasing a torque proportional gain that corresponds to the proportional relationship. At this time, if the torque proportional gain is too large, a control system oscillates to bring about steering wheel oscillations. In some cases, the degree to which the steering torque is reduced is therefore restricted. In order to solve this problem, an algorithm for suppressing oscillations by improving the phase characteristic of the control system through introduction of a phase compensator has been invented to prevent the steering wheel oscillations (refer to, for example, a reference literature 1).

For the purpose of improving oscillation suppression performance, in addition to the phase compensator, a control algorithm that suppresses oscillations by inferring an oscillation frequency component of a motor rotating speed from a steering torque signal and a current signal, which drives a motor, by means of an observer, and feeding back the oscillation frequency component has been invented to prevent steering wheel oscillations (refer to, for example, a reference literature 2).

Patent document 1: JP-A-8-91236 (p. 4, FIG. 1)
Patent document 2: JP-A-2000-168600 (p. 10, FIG. 12)

DISCLOSURE OF THE INVENTION

Problems to be Solved by the Invention

In the electric power steering system, a majority of the control algorithm is constituted by software, the steering torque signal is fetched into a microcomputer through a torque signal converter, that is, an A/D conversion circuit, and then arithmetically processed. This is because the oscillation frequency in electric power steering is relatively low to range from 30 Hz to 100 Hz. However, there are a case where the phase compensator alone included in the control algorithm is formed by software and the microcomputer is used for computation, and a case where an analog circuit directly performs phase compensation. When the microcomputer is used for computation, if the oscillation frequency of the control system is high, high-speed arithmetic processing is required. An expensive microcomputer is therefore needed.

When the analog circuit performs phase compensation, since a steering torque signal on which phase compensation is not performed is needed for the computation by the observer, both a steering torque signal on which phase compensation is performed by the analog circuit and a steering torque signal on which phase compensation is not performed have to be A/D-converted and fetched into the microcomputer. The number of required A/D conversion circuits therefore increases.

As mentioned above, when the control algorithm that suppresses oscillations by inferring an oscillation frequency component of a motor rotating speed from a steering torque signal and a current signal, which drives a motor, by means of an observer, and feeding back the oscillation frequency component is used in addition to the phase compensator, whether the phase compensator is formed by an analog circuit or software, the cost increases.

The invention is intended to solve the foregoing problems and to provide an electric power steering control system that realizes excellent oscillation suppression performance without increasing the number of A/D conversion circuits, that is, without inviting an increase in the cost.

Means for Solving the Problems

An electric power steering system in accordance with the invention includes: a torque detection means that detects a steering torque caused by a driver; an analog phase compensator that performs phase compensation on an output of the torque detection means by means of an analog circuit; a torque signal converter that A/D-converts an output of the analog phase compensator and fetches the resultant output into a microcomputer; a torque controller that computes an auxiliary torque current, which assists the steering torque, using the output of the torque signal converter; a motor that generates a torque which assists the steering torque; a current detection means that detects a current value to be conducted to the motor; a rotating speed estimation means that estimates the rotating speed of the motor; and a damping controller that computes a damping current, which is added to the auxiliary torque current, using an estimate value of the motor rotating speed estimated by the rotating speed estimation means. The rotating speed estimation means includes a rotating speed observer that computes the estimate value of the motor rotating speed using the output of a torque opposite phase compensator that adjusts the phase and gain of the output of the torque signal converter, and the output of the current detection means.

ADVANTAGE OF THE INVENTION

According to the invention, the phase compensator for a steering torque is formed with an analog circuit, and the opposite phase compensator is formed by software in the microcomputer. The changes in a gain and a phase caused by the phase compensator of an analog circuit are canceled at an oscillation frequency. A steering torque signal equivalent to a steering torque signal that is needed for computation by the observer and has not undergone phase compensation is computed from a steering torque signal having undergone phase compensation. Since this obviates the necessity of A/D-converting the steering torque signal that has not undergone phase compensation, and fetching the resultant signal into a microcomputer, the number of A/D conversion circuits decreases. Eventually, excellent oscillation suppression performance can be realized without an increase in the cost.

BRIEF DESCRIPTION OF THE DRAWINGS

FIG. 2 includes Bode diagrams showing the frequency characteristics of an opposite phase compensator of the controller in the embodiment 1;

DESCRIPTION OF REFERENCE NUMERALS

1: torque sensor, 2: analog phase compensator, 3: torque A/D converter, 4: current detector, 5: current A/D converter, 6: torque controller, 7: torque opposite phase compensator, 8: torque HPF, 9: current HPF, 10: motor rotation observer, 11: damping controller, 12: adder, 13: current controller, 14: drive circuit, 15: motor, 16: torque phase lead reducer, 17: current phase lead reducer, 18: first rotating speed estimator, 19: second rotating speed estimator

BEST MODE FOR CARRYING OUT THE INVENTION

Embodiment 1

Figure 1:
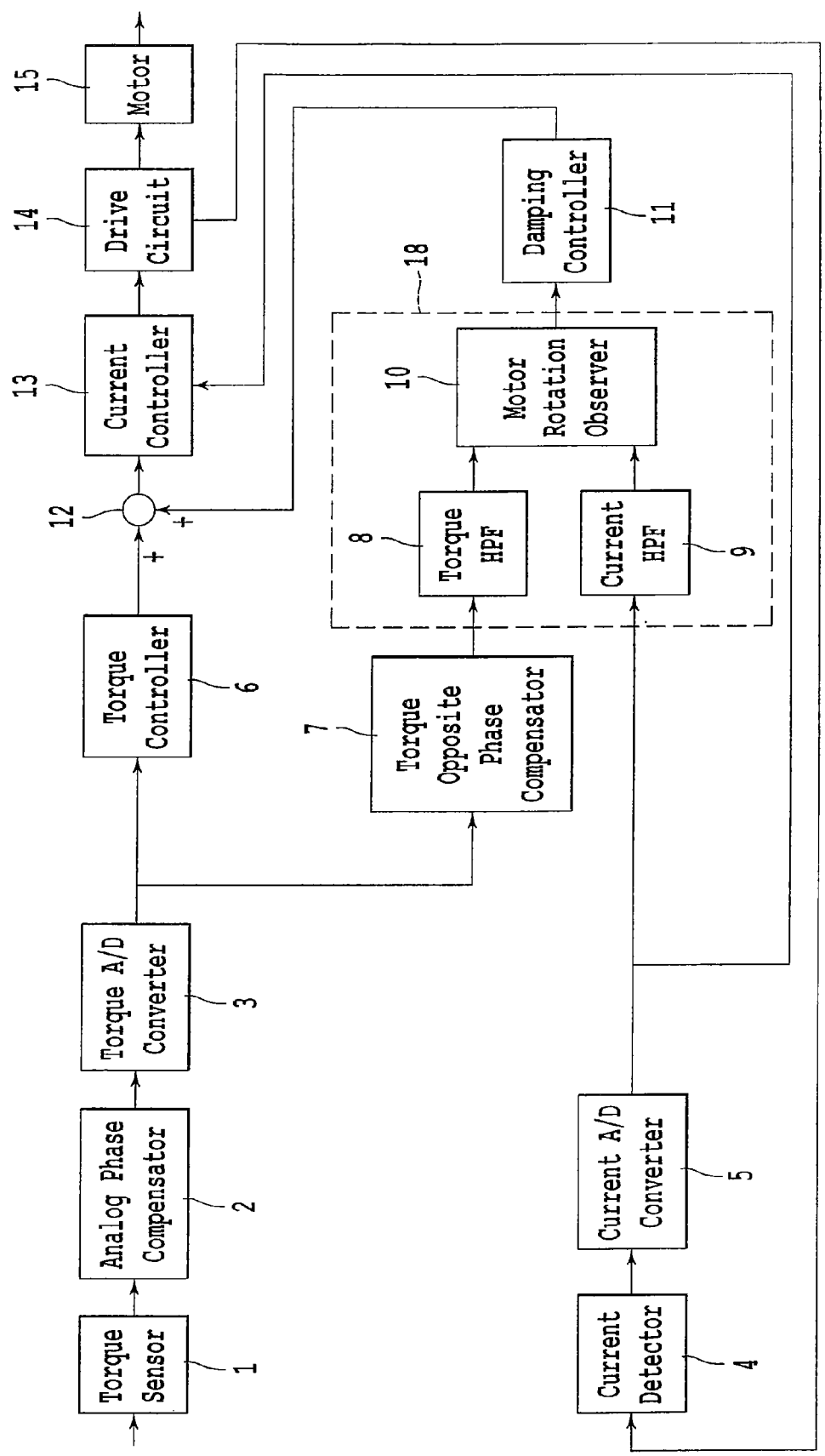
FIG. 1 is a block diagram showing the configuration of a controller in an embodiment 1.

FIG. 1 is a block diagram showing the configuration of a controller in an embodiment 1 of the invention. A steering torque occurring when a driver performs steering is detected by a torque sensor 1, and an analog phase compensator 2 formed with an analog circuit improves a frequency characteristic so that a phase will most greatly lead at an oscillation frequency $f_{vib}$. A torque sensor output for which the frequency characteristic is improved is converted into a digital signal by an A/D converter 3, and fetched into a microcomputer. A current which drives a motor is detected by a current detector 4, converted into a digital signal by a current A/D converter 5, and fetched into the microcomputer. In the microcomputer, a torque controller 6 computes an auxiliary torque current using the torque sensor output for which the frequency characteristic is improved. A torque opposite phase compensator 7 computers an opposite characteristic of the analog phase compensator, and inputs the opposite characteristic to a first rotating speed estimator 18 (part of the drawing encircled with a dot line). The first rotating speed estimator 18 estimates or computes a motor rotating speed, which has a low-frequency component thereof cut by a motor rotation observer (identical to a rotating speed observer) (the same applies to a description to be made below) 10, using a signal produced by cutting a low-frequency component of the steering torque signal, for which the frequency characteristic is returned to a frequency characteristic equivalent to that for a phase-uncompensated steering torque, through high-pass filter computation performed by a torque HPF 8, and a signal produced by cutting a low frequency component of a current through high-pass filter computation performed by a current HPF 9. A damping controller 11 computes a damping current using the resultant estimated motor rotating speed, and an adder 12 adds up an auxiliary torque current and the damping current so as to perform target current computation. A current controller 13 controls a current so that the computed target current and a current detected by the current detector 4 will be squared with each other. The resultant current is outputted as a voltage command signal, for example, a PWM signal to a drive circuit 14, and a motor 15 is driven so that an assist torque will be generated. Herein, the motor rotation observer 10 that performs estimation computation of a motor rotating speed is, for example, an observer using as a model a single-degree-of-freedom oscillation equation that has an inertia moment of a motor as an inertial term and a spring constant of a torque sensor as a spring term (the same applies to a description to be made later). Moreover, in the invention, the rotating speed estimation means encompasses as an example thereof the first rotating speed estimator.

As shown in FIG. 2, the characteristic B of the torque opposite phase compensator 7 is determined to be opposite to the characteristic A of the analog phase compensator 2. Specifically, assuming that the characteristic A of the analog phase compensator 2 causes a gain to increase within a frequency range from $f_{a1}$ to $f_{a2}$, $f_{a1}=f_{i1}$ and $f_{a2}=f_{i2}$ are established so that a frequency range from $f_{i1}$ to $f_{i2}$ within which the characteristic B of the torque opposite phase compensator 7 causes a gain to decrease will be identical to the frequency range from $f_{a1}$ to $f_{a2}$. A total characteristic that is a combination of the characteristic A of the analog phase compensator 2 and the characteristic B of the torque opposite phase compensator 7 shall be a characteristic C.

Moreover, a maximum frequency to be cut by a high-pass filter that is the torque HPF (where HPF stands for a high-pass filter) (The same applies to a description to be made below.) 8 or the current HPF 9 is set to a frequency higher than 5 Hz that is a maximum frequency which a driver can support.

Figure 3:
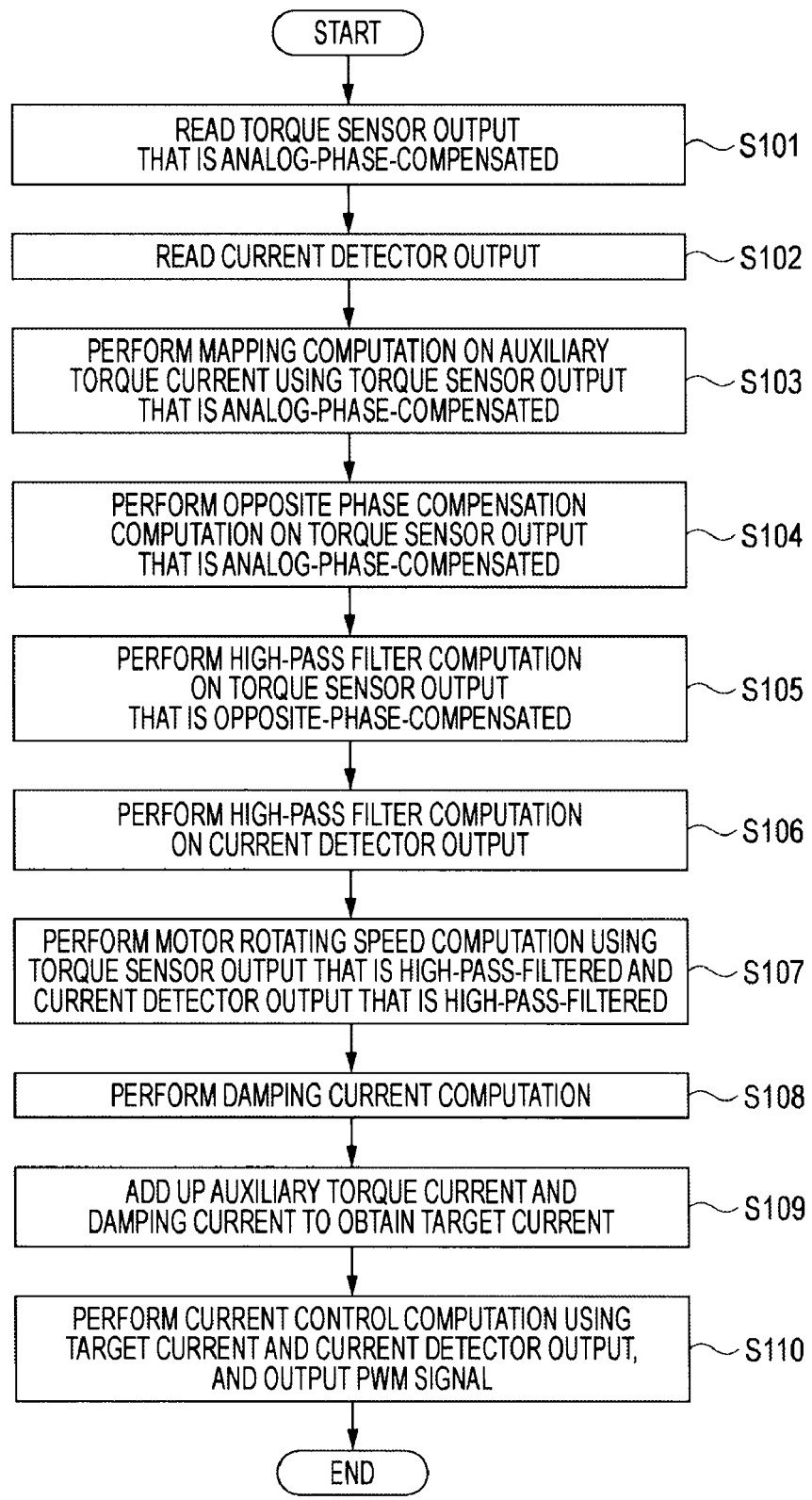
FIG. 3 is a flowchart presenting processing to be performed in a microcomputer of the controller in the embodiment 1.

Next, a processing algorithm in the microcomputer in the embodiment 1 will be described in conjunction with the flowchart of FIG. 3.

First, at step S101, a torque sensor output that is A/D-converted by the torque A/D converter 3 and is analog-phase-compensated is read and stored in a memory. At step S102, the current A/D converter 5 reads an A/D-converted current detection value (identical to a current detector output) (the same applies to a description to be made below.), and stores it in the memory. At step S103, the torque controller 6 reads the torque sensor output, which is stored in the memory and is analog-phase-compensated, performs mapping computation on an auxiliary torque current, and stores the resultant current in the memory. At step S104, the torque opposite phase compensator 7 reads the torque sensor output, which is stored in the memory and is analog-phase-compensated, performs opposite phase compensation computation, and stores the torque sensor output, which has undergone opposite phase compensation computation, in the memory. At step S105, the torque HPF 8 performs high-pass filter computation on the torque sensor output that is stored in the memory and has undergone opposite phase compensation computation, and stores the torque sensor output, which is high-pass-filtered, in the memory. At step S106, the current HPF 9 performs high-pass filter computation on the current detection value that is stored in the memory, and stores the current detection value, which is high-pass-filtered, in the memory. At step S107, the motor rotation observer 10 performs motor rotating speed computation using the torque sensor output, which is stored in the memory and is high-pass-filtered, and the current detection value that is high-pass-filtered, and stores the result in the memory. At step S108, the damping controller 11 computes a damping current by multiplying the motor rotating speed, which is stored in the memory, by a gain, and stores the damping current in the memory. At step S109, the adder 12 adds up the auxiliary torque current and damping current so as to obtain a target current. At step S110, the current controller 13 performs current control computation using the target current and current detection value, and outputs the result as a voltage command signal such as a PWM signal to the drive circuit 14. The processing from step S101 to step S110 is executed for every control sampling.

According to the foregoing constitution, a torque sensor signal that is needed for computation of an auxiliary torque current by the torque controller 6 and is analog-phase-compensated, and a torque sensor signal that is needed for computation by the motor rotation observer 10 and is not phase-compensated can be obtained with the one torque A/D converter 3. Consequently, excellent oscillation suppression performance can be realized without an increase in a cost.

In the present embodiment, an electric signal to be inputted to the current HPF 9 is detected by the current detector 4, and a current detection value obtained by converting the current signal into a digital signal by the current A/D converter 5 is employed. Alternatively, a target current computed by the adder 12 may be employed.

Embodiment 2

Figure 4:
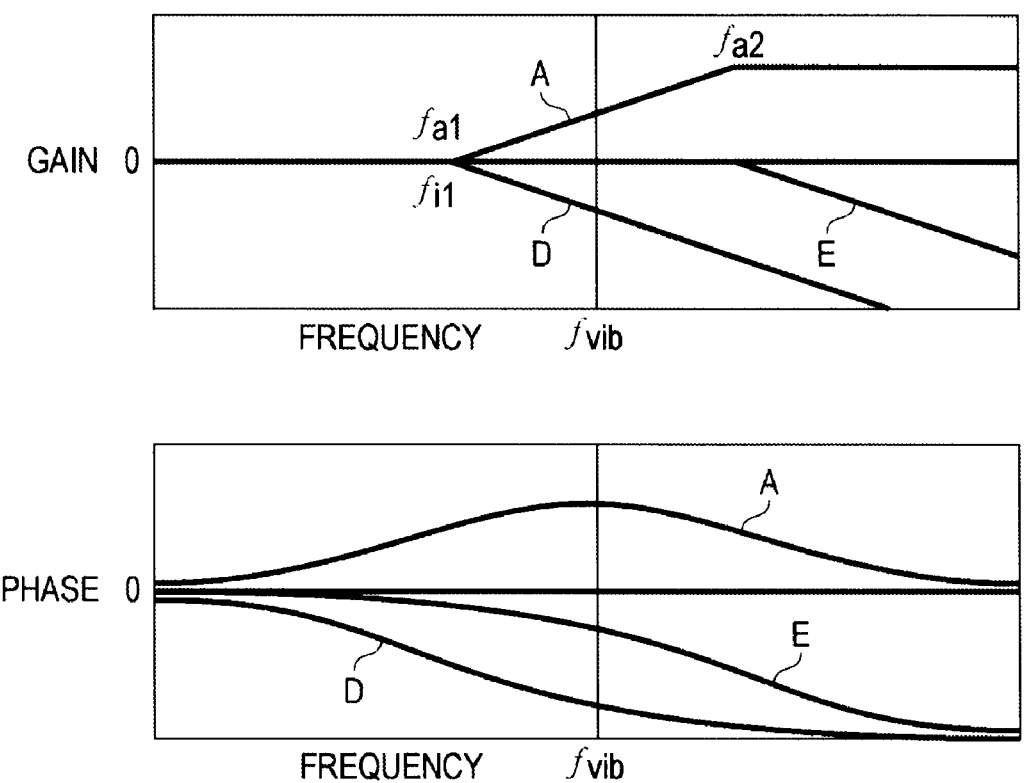
FIG. 4 includes Bode diagrams showing the frequency characteristics of an opposite phase compensator of a controller in an embodiment 2.

The embodiment 2 is different from the embodiment 1 in the software configuration of the torque opposite phase compensator 7. The difference alone will be described using FIG. 4.

In the embodiment 2, the characteristic D of the torque opposite phase compensator 7 is approximated to the characteristic of the analog phase compensator 2. Specifically, assuming that the characteristic A of the analog phase compensator 2 is a characteristic causing a gain to increase at a ratio of, for example, 20 dB/dec within a frequency range from $f_{a1}$ to $f_{a2}$, the torque opposite phase compensator 7 shall be a low-pass filter that causes a gain to begin decreasing at $f_{i1}$ at the ratio of 20 dB/dec, and f is established. When computing a damping current, the damping controller 11 needs a highly precise motor rotating speed signal relative to a frequency at which steering wheel oscillations occur. Consequently, the motor rotation observer 10 needs a torque sensor output, which is devoid of a phase shift caused by the analog phase compensator 2, relative to the frequency at which the steering wheel oscillations occur. On the other hand, since $f_{a1}$ and $f_{a2}$ are determined so that the range from $f_{a1}$ to $f_{a2}$ will include the frequency at which steering wheel oscillations occur, even when the torque opposite phase compensator is the low-pass filter that causes a gain to begin decreasing at $f_{i1}$, the total characteristic that is the combination of the characteristic A of the analog phase compensator 2 and the characteristic D of the torque opposite phase compensator 7 causes, as indicated with E, a gain to remain even and causes a phase shift to diminish. Consequently, a higher-precision motor rotating speed signal can be obtained than that obtained when the torque opposite phase compensator 7 is not included. As a result, the same steering wheel oscillation reduction effect as that of the embodiment 1 can be realized.

According to the foregoing constitution, since a simple low-pass filter is employed, the necessity of computing a characteristic opposite to the characteristic of the analog phase compensator 2 over a high-frequency domain over which high-speed arithmetic processing is required is obviated. Consequently, the foregoing effect can be realized despite an inexpensive microcomputer.

Embodiment 3

Figure 5:
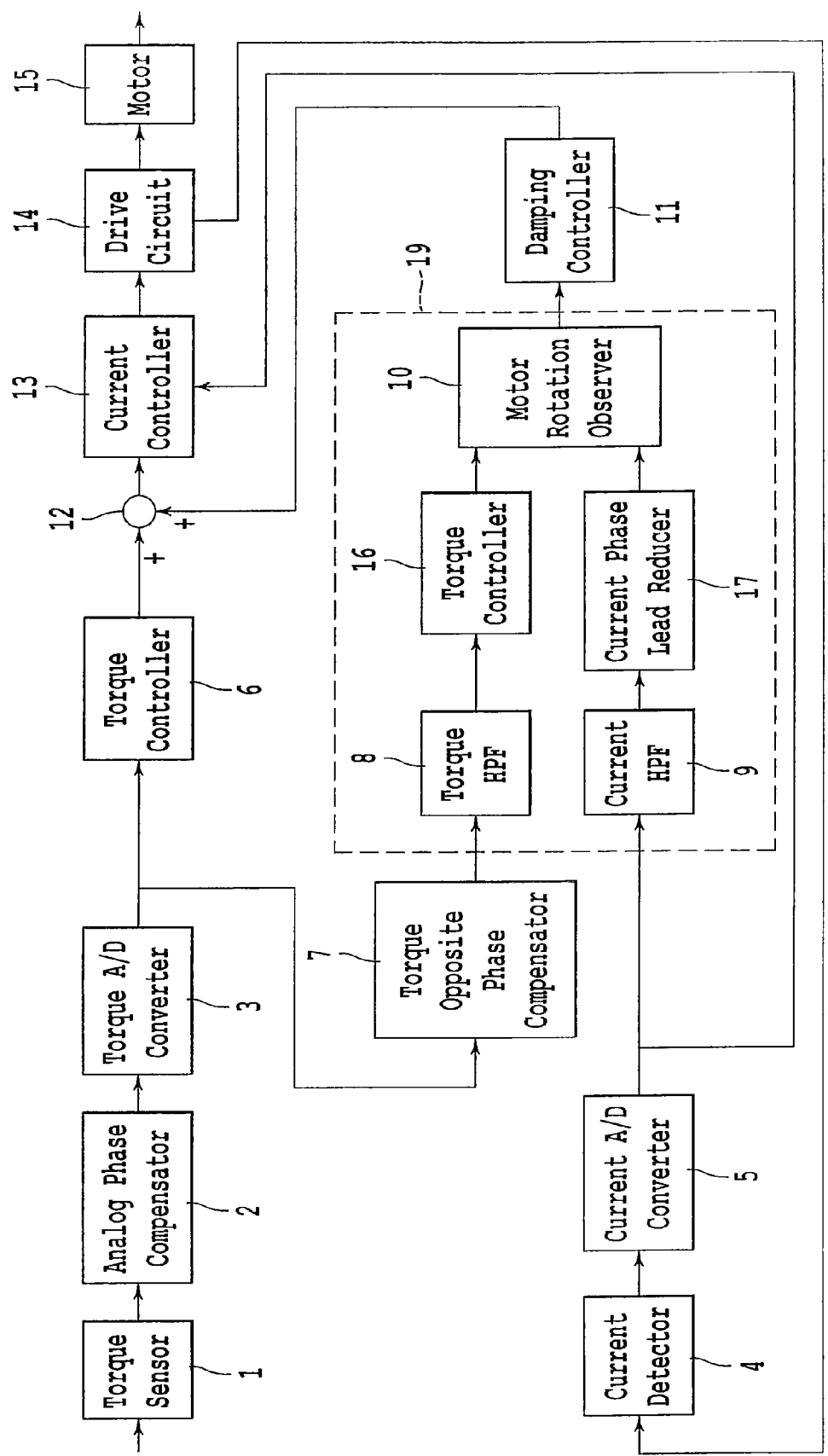
FIG. 5 is a block diagram showing the configuration of a controller in an embodiment 3.

FIG. 5 is a block diagram showing the configuration of a controller in the embodiment 3 of the invention. In addition to the components of the embodiment 1, a torque phase lead reducer 16 is disposed on a stage succeeding the torque HPF 8 in the second rotating speed estimator 19, and a current phase lead reducer 17 is disposed on a stage succeeding the current HPF 9 therein.

Figure 6:
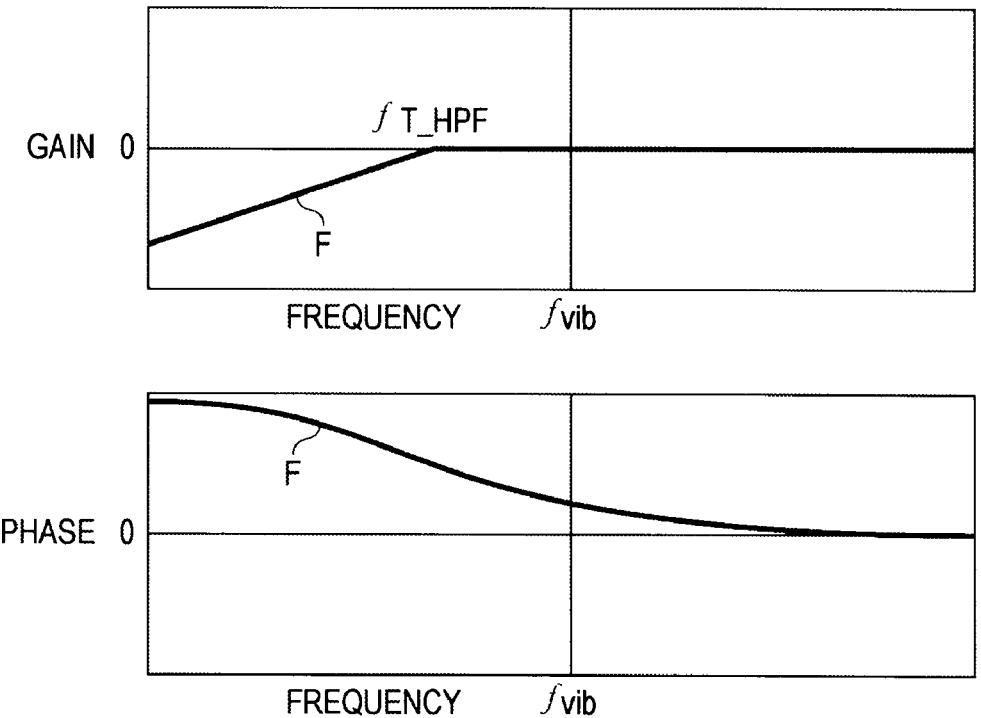
FIG. 6 includes Bode diagrams showing the frequency characteristics of a torque HPF of the controller in the embodiment 3.
Figure 7:
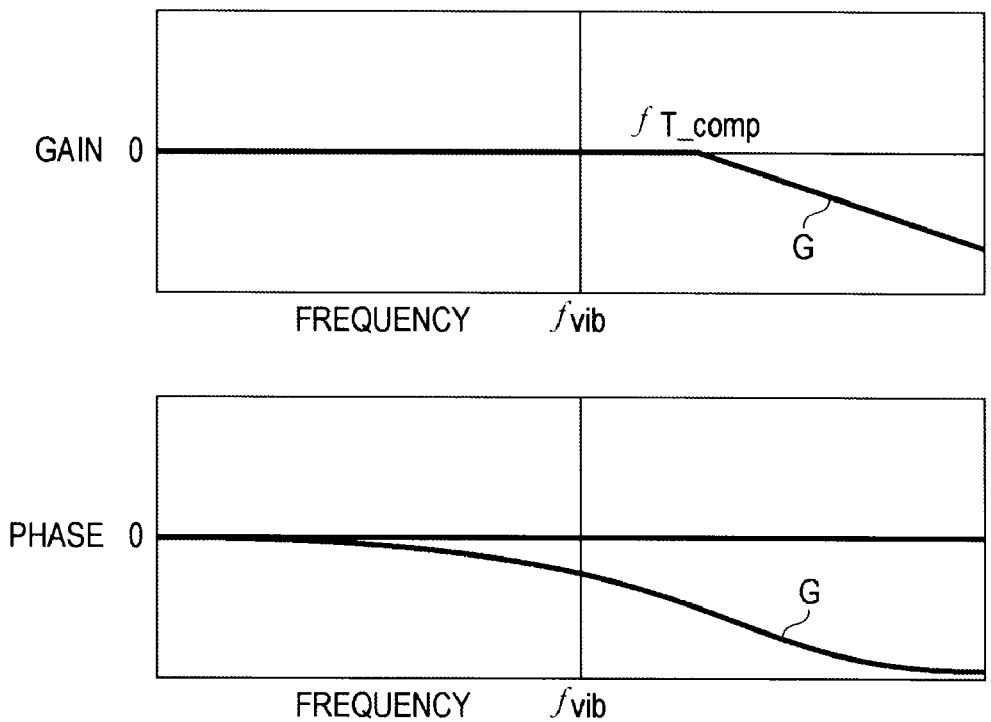
FIG. 7 includes Bode diagrams showing the frequency characteristics of a torque phase lead reducer of the controller in the embodiment 3.

The characteristic F of the torque HPF 8 demonstrates, as shown in FIG. 6, that a low-frequency component of a steering torque signal is cut at an oscillation occurrence frequency but the phase of the steering torque signal is caused to lead at a steering wheel oscillation frequency. Consequently, the torque phase lead reducer 16 having, as shown as a characteristic G in FIG. 7, a low-pass filter characteristic that causes the ratio between the steering wheel oscillation frequency $f_{vib}$ and the cutoff frequency $f_{T\_HPF}$ of the torque HPF 8 and the ratio between the cutoff frequency $f_{T\_comp}$ of the torque phase lead reducer 16 and the steering wheel oscillation frequency $f_{vib}$ to be identical to each other is disposed on the stage succeeding the torque HPF 8. Moreover, the current phase lead reducer 17 having the same frequency characteristic as the torque phase lead reducer 16 does is disposed on the stage succeeding the current HPF 9. In the invention, the rotating speed estimation means encompasses as an example thereof the second rotating speed estimator.

Figure 8:
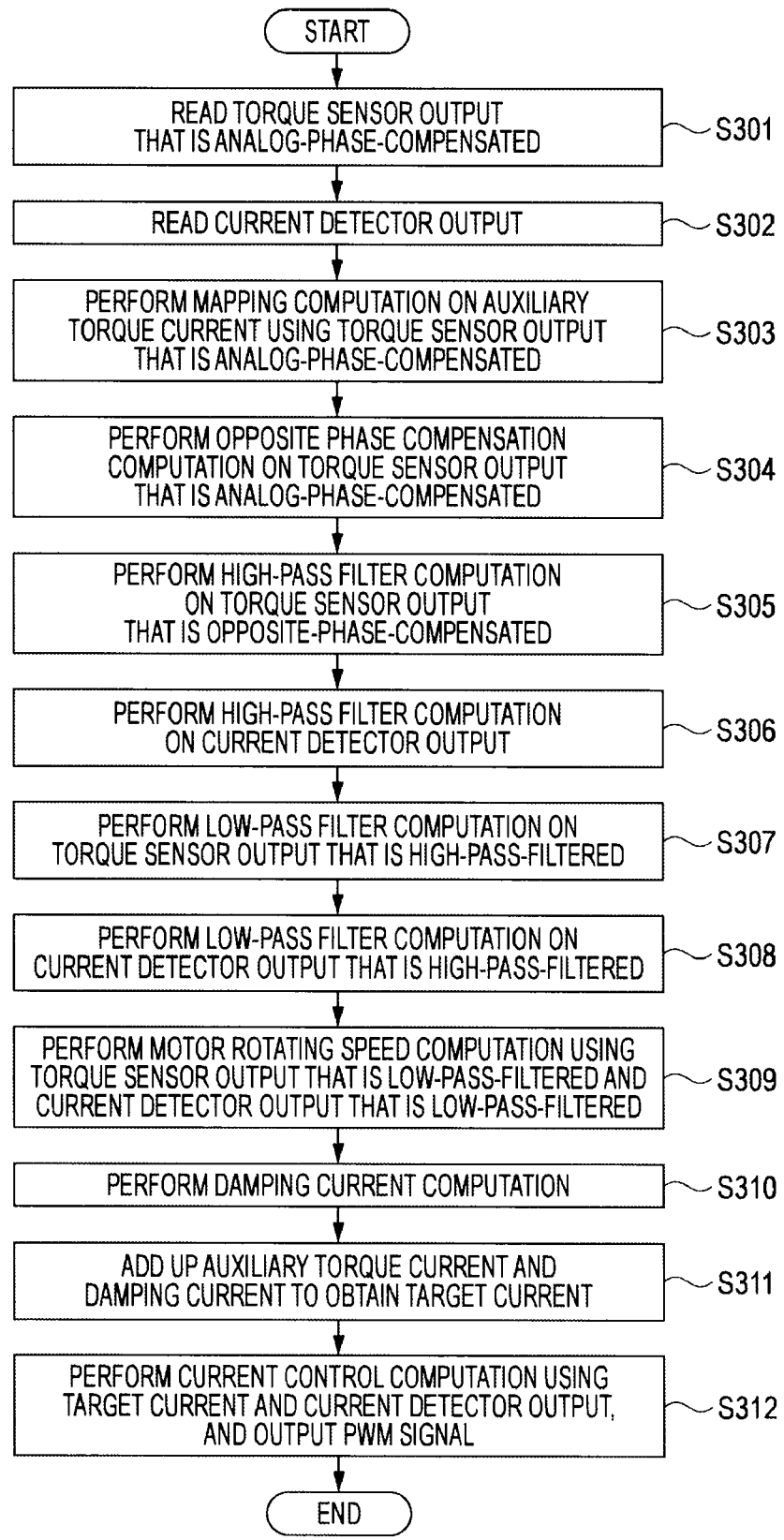
FIG. 8 is a flowchart presenting processing to be performed in a microcomputer of the controller in the embodiment 3.

Next, a processing algorithm in the microcomputer of the embodiment 3 will be described below in conjunction with the flowchart of FIG. 8.

First, at step S301, a torque sensor output that is A/D-converted by the torque A/D converter 3 and is analog-phase-compensated is read and stored in the memory. At step S302, a current detection value that is A/D-converted by the current A/D converter 5 is read and stored in the memory. At step S303, the torque controller 6 reads the torque sensor output that is stored in the memory and is analog-phase-compensated, performs mapping computation on an auxiliary torque current, and stores the resultant current in the memory. At step S304, the torque opposite phase compensator 7 reads the torque sensor output that is stored in the memory and is analog-phase-compensated, performs opposite phase compensation computation, and stores the torque sensor output, which has undergone opposite phase compensation computation, in the memory. At step S305, the torque HPF 8 performs high-pass filter computation on the torque sensor output that is stored in the memory and has undergone opposite phase compensation computation, and stores the torque sensor output, which is high-pass-filtered, in the memory. At step S306, the current HPF 9 performs high-pass filter computation on the current detection value that is stored in the memory, and stores the current detection value, which is high-pass-filtered, in the memory. At step S307, the torque phase lead reducer 16 performs low-pass filter computation on the torque sensor output that is stored in the memory and is high-pass-filtered, and stores the torque sensor output, which is low-pass-filtered, in the memory. At step S308, the current phase lead reducer 17 performs low-pass filter computation on the current detection value that is stored in the memory and is high-pass-filtered, and stores the current detection value, which is low-pass-filtered, in the memory. At step S309, the motor rotation observer 10 performs motor rotating speed computation using the torque sensor output, which is stored in the memory and is low-pass-filtered, and the current detection value that is low-pass-filtered, and stores the result in the memory. At step S310, the damping controller 11 performs damping current computation by multiplying the motor rotating speed, which is stored in the memory, by a gain, and stores the result in the memory. At step S311, the adder 12 adds up an auxiliary torque current and a damping current so as to obtain a target current. At step 312, the current controller 13 performs current control computation using the target current and current detection value, and outputs the result as a voltage command signal such as a PWM signal to the drive circuit 14. The processing from step S301 to step S312 is executed for every control sampling.

Figure 9:
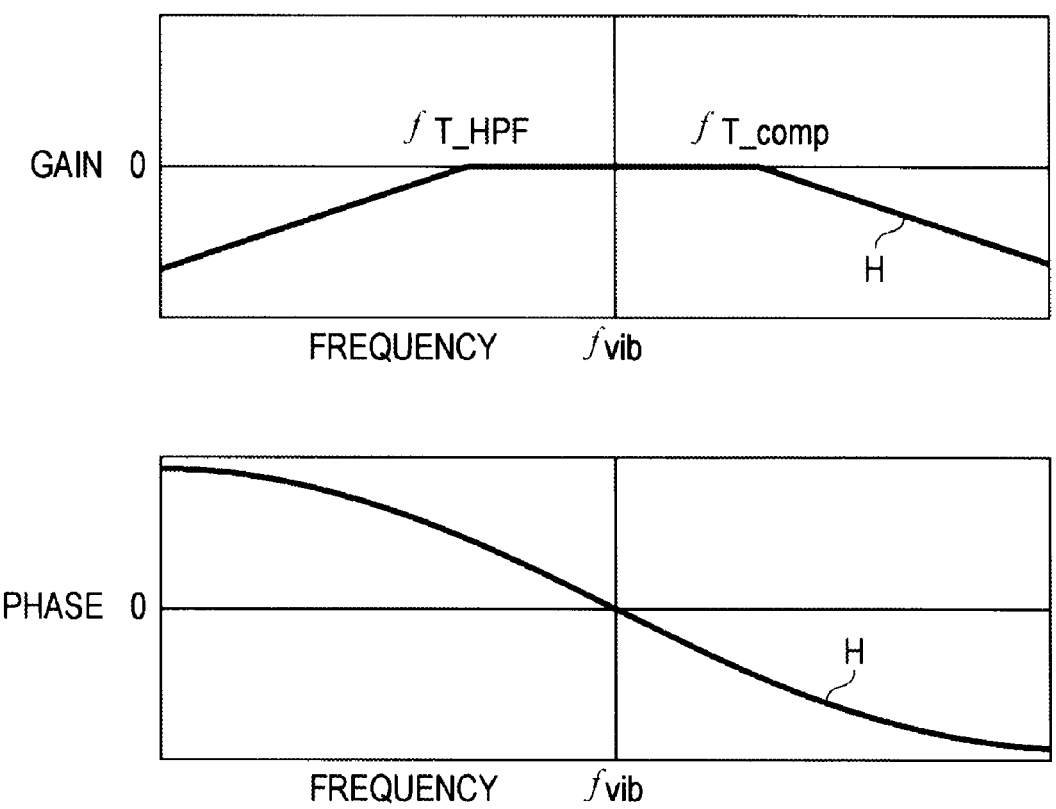
FIG. 9 includes Bode diagrams showing the frequency characteristics of a combination of a torque HPF and a torque phase lead reducer of the controller in the embodiment 3.

According to the foregoing constitution, since the torque phase lead reducer 16 is disposed on the stage succeeding the torque HPF 8, a characteristic (total characteristic H in FIG. 9) that is a combination of the characteristic F of the torque HPF 8 and the characteristic G of the torque phase lead reducer 16 can be obtained. As seen from the total characteristic H in FIG. 9, both a gain and a phase are 0s at the steering wheel oscillation frequency $f_{vib}$. Consequently, a shift can be eliminated, and the precision in a motor rotating speed signal improves. As a result, an excellent steering wheel oscillation reduction effect can be realized.

The invention claimed is:

1. An electric power steering control system, comprising:
    a torque detection means that detects a steering torque caused by a driver;
    an analog phase compensator that performs phase compensation on the output of the torque detection means by means of an analog circuit;
    a torque signal converter that A/D-converts the output of the analog phase compensator and fetches the output into a microcomputer;
    a torque controller that computes an auxiliary torque current, which assists the steering torque, using the output of the torque signal converter;
    a motor that generates a torque which assists the steering torque;
    a current detection means that detects a current value to be conducted to the motor;
    a rotating speed estimation means that estimates the rotating speed of the motor; and
    a damping controller that computes a damping current, which is added to the auxiliary torque current, using the estimate value of the motor rotating speed estimated by the rotating speed estimation means, wherein:
    the rotating speed estimation means includes a rotating speed observer that computes the estimate value of the rotating speed of the motor using the output of a torque opposite phase compensator which adjusts the phase and gain of the output of the torque signal converter, and the output of the current detection means.

2. The electric power steering control system according to claim 1, wherein the torque opposite phase compensator adjusts the output of the torque signal converter by performing opposite characteristic computation for the analog phase compensator so as to convert the opposite characteristic into the frequency characteristic identical to that for the output of the torque detection means.

3. The electric power steering control system according to claim 2, wherein the torque opposite phase compensator determines the opposite characteristic of the analog phase compensator so that a gain will diminish within a frequency range equal to or higher than a cutoff frequency on a high-frequency side of the analog phase compensator.

4. The electric power steering control system according to claim 3, wherein the torque opposite phase compensator is formed with a low-pass filter.

5. The electric power steering control system according to claim 1, wherein the rotating speed estimation means further comprises:
    motor current steering component removal means that removes a component caused by steering from the output of the current detection means; and torque steering component removal means that removes a component caused by steering from the output of the torque detection means;
    wherein the rotating speed observer computes the estimate value of the rotating speed of the motor using the current which has the steering component thereof removed by the motor current steering component removal means, and the steering torque outputted from the torque steering component removal means, and
    wherein at least one of a motor current phase lead reducer that diminishes a phase lead caused by the motor current steering component removal means, and a torque phase lead reducer that diminishes a phase lead caused by the torque steering component removal means is included.

* * * * *